UNITED STATES PATENT OFFICE.

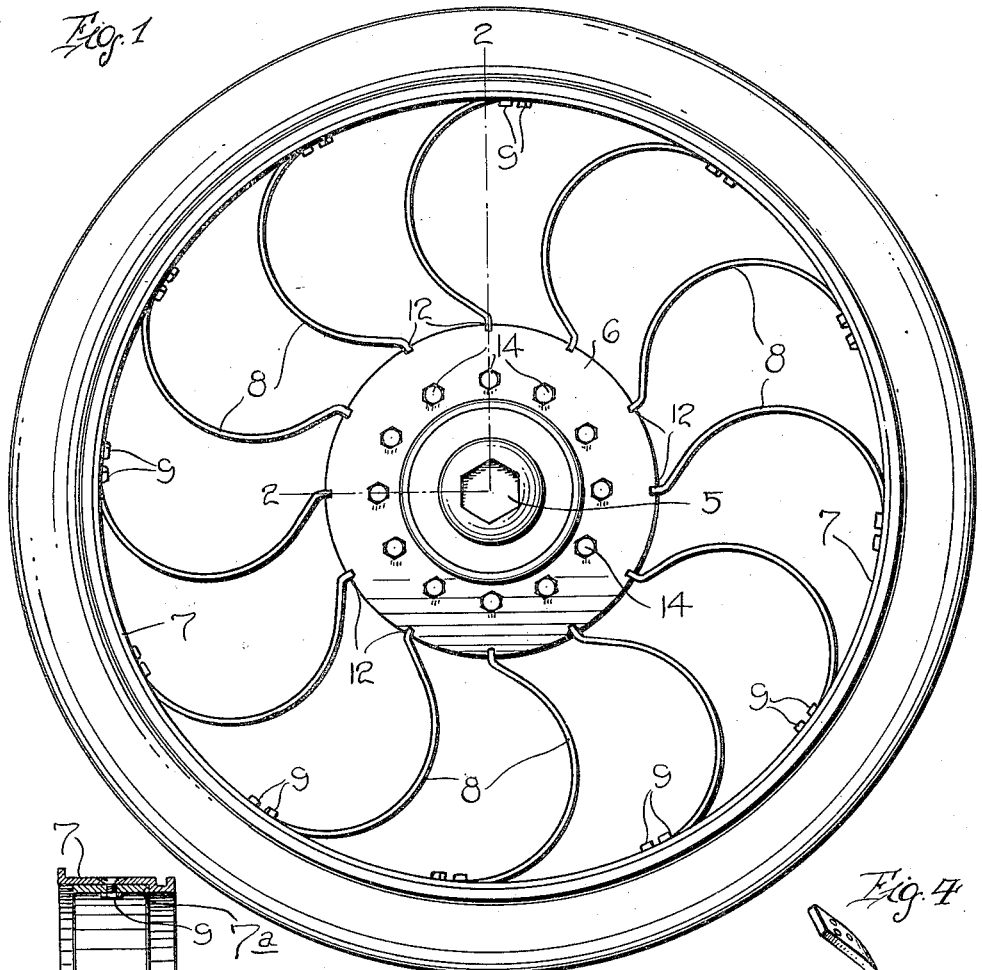

CHARLES V. BRANDT, OF RICHMOND, VIRGINIA.

SPRING-WHEEL.

1,101,680. Specification of Letters Patent. Patented June 30, 1914.

Application filed June 14, 1913. Serial No. 773,714.

*To all whom it may concern:*

Be it known that I, CHARLES V. BRANDT, a citizen of the United States, residing at Richmond, in the county of Henrico and State of Virginia, have invented certain new and useful Improvements in Spring-Wheels, of which the following is a specification, reference being had to the accompanying drawings.

This invention relates to certain new and useful improvements in spring wheels of that character designed for use upon automobiles and other vehicles, the primary object of the invention residing in the provision of improved means for mounting the inner ends of the springs in the wheel hub.

The invention has for another and more specific object the provision of a plurality of springs of curvilinear form arranged between the rim and hub of the wheel, the wheel hub consisting of spaced plates provided at intervals with notches or recesses, said springs having formed upon their opposite edges and adjacent their inner ends, shoulders for engagement in said notches, and sleeves formed upon the inner ends of the spring plates to receive bolts extending through the hub plates.

The invention has for a further object to provide a spring wheel of simple and durable construction, whereby vibration is practically eliminated, thus relieving the engine and all other parts of the vehicle of considerable strain and materially conducing to the comfort of the occupants of the vehicle.

With the above and other objects in view, as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation of a spring wheel embodying the preferred form of my invention. Fig. 2 is a section taken on the line 2—2 of Fig. 1. Fig. 3 is a section taken on the line 3—3 of Fig. 2. Fig. 4 is a detail perspective view of one of the spring plates.

Referring in detail to the drawing, 5 designates the hub of the vehicle wheel which includes a body having spaced annular plates or flanges 6.

7 designates the rim of the wheel upon which a tire of any approved construction, but preferably of solid rubber, is adapted to be secured.

Between the hub and rim of the wheel, a plurality of curved spring plates 8 are arranged. Each of the plates is of a width equivalent to the distance between the outer faces of the hub plates or flanges 6 and is secured at its outer end to the wheel rim by means of a plurality of bolts 9, the heads of which are countersunk in the outer face of the rim. It will be understood that any desired number of these fastening bolts may be employed. The inner ends of the spring plates are reduced in width, as indicated at 10, to provide the shoulders 11 on opposite edges thereof. These reduced inner ends of the spring plates are adapted to be arranged between the opposed faces of the hub flanges and the shoulders thereon engaged in peripheral notches or recesses 12 formed in said flanges. Upon the extremity of the reduced end 10 of each spring plate a cuff or sleeve 13 is formed. Through these sleeves securing bolts 14 are adapted to be inserted, said bolts extending through openings provided in the hub flanges. The spaces between the inner ends of the spring plates and the opposed faces of the hub flanges are preferably closed by means of the plates 15, integrally formed on the edges of the flanges 6, whereby the collection of dirt or other foreign matter in said spaces is prevented.

It is to be observed that the rim 7 on its under surface adjacent its marginal portion is provided with an annular shoulder 7ᵃ with which the adjacent edge portions of the plate which are secured thereto are adapted to snugly contact in order to serve as an effective means to prevent such plates from lateral movement or distortion.

From the foregoing, it is believed that the construction and several advantages of my improved spring wheel will be clearly and fully understood. By the provision of the shoulders on the inner ends of the spring plates for engagement in the recesses provided in the disk flanges, the fastening or securing bolts are relieved of considerable strain while the inner ends of the spring plates are effectually held against any circumferential movement with relation to the wheel hub.

My improved wheel structure as a whole is extremely strong and durable, and owing to its simplicity, it will be appreciated that the same can be produced at small manufacturing cost.

As the provision of the series of spring plates between the wheel hub and rim serves to absorb all vibration which would otherwise be imparted to the vehicle body in traveling over rough roads, it will be obvious that the engine of the vehicle is protected against injury and its life materially prolonged. As solid rubber tires may be employed, it will be further appreciated that the expense incident to the use of pneumatic wheel tires is avoided.

While I have shown and described the preferred construction and arrangements of the several elements employed, it will be understood that the invention is susceptible of considerable modification therein, without necessarily departing from the essential features or sacrificing any of the advantages thereof.

What I claim, is:

The combination with a wheel rim and hub, said hub embodying spaced flanges provided in their outer marginal portions with a plurality of notches, of a plurality of curved spring plates extending between the rim and hub and fixed at their outer extremities to said rim, the inner extremities of such plates being angularly disposed to afford straight portions, the lower portion of such straight extremities being reduced to fit between the flanges of the hub, the wider portions of such extremities being insertible within the notches of the flanges, such straight extremities being disposed a distance beyond the periphery of the flanges, and fastening means engageable with the flanges of the hub and the spokes for maintaining the same in operative relation, the straight portion of each of said spring plates being radially alined when in assembled position with a point of engagement of the outer extremity of such plate with the rim, such outer end of such straight portion terminating in close proximity with the periphery of the hub and serving as a point of flexure.

In testimony whereof I hereunto affix my signature in the presence of two witnesses.

CHARLES V. BRANDT.

Witnesses:
 M. ZINDEMO,
 J. M. BRANDT.

---

Copies of this patent may be obtained for five cents each, by addressing the "Commissioner of Patents, Washington, D. C."